US009799202B2

(12) United States Patent
Dow et al.

(10) Patent No.: US 9,799,202 B2
(45) Date of Patent: *Oct. 24, 2017

(54) WEARABLE COMPUTING SYSTEM WITH TEMPORAL FEEDBACK

(71) Applicant: International Business Machines Corporation, Armonk, NY (US)

(72) Inventors: Eli M. Dow, Wappingers Falls, NY (US); Thomas D. Fitzsimmons, Poughkeepsie, NY (US); Tynan J. Garrett, Poughkeepsie, NY (US); Emily M. Metruck, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/163,828

(22) Filed: May 25, 2016

(65) Prior Publication Data
US 2017/0140633 A1 May 18, 2017

Related U.S. Application Data

(63) Continuation of application No. 14/939,353, filed on Nov. 12, 2015, now Pat. No. 9,600,985.

(51) Int. Cl.
*H04B 3/36* (2006.01)
*G08B 21/24* (2006.01)
(Continued)

(52) U.S. Cl.
CPC ............. *G08B 21/24* (2013.01); *G04G 21/00* (2013.01); *G06F 1/163* (2013.01); *G06Q 10/109* (2013.01); *G08B 6/00* (2013.01)

(58) Field of Classification Search
CPC .......... G08B 21/24; G08B 6/00; G04G 21/00; G06F 1/163
(Continued)

(56) References Cited

U.S. PATENT DOCUMENTS

| 2009/0172550 A1* | 7/2009 | Dantec | G06Q 10/10 715/732 |
| 2015/0123775 A1* | 5/2015 | Kerdemelidis | G08B 6/00 340/407.1 |

OTHER PUBLICATIONS

Dow, Eli M., et al., Pending U.S. Appl. No. 15/401,479 entitled "Wearable Computing System With Temporal Feedback During a Presentation," filed Jan. 9, 2017.
(Continued)

*Primary Examiner* — Jack K Wang
(74) *Attorney, Agent, or Firm* — Cantor Colburn LLP; Steven Chiu (57) ABSTRACT

Aspects include a system for providing feedback to a user with a wearable device. The system including a wearable device and a feedback mechanism disposed within the wearable device. The feedback mechanism configured to vibrate the wearable device. A memory is provided having computer readable instructions. One or more processors are provided for executing the computer readable instructions, the one or more processors being coupled to communicate with the feedback mechanism. The computer readable instructions include defining at least one prompt point that is associated with a first time parameter. The instructions further include determining when the current time is equal to the first time parameter. The instructions provide for actuating the feedback mechanism in response to the current time being equal to the first time period.

9 Claims, 6 Drawing Sheets

(51) Int. Cl.
| | |
|---|---|
| *G08B 6/00* | (2006.01) |
| *G04G 21/00* | (2010.01) |
| *G06F 1/16* | (2006.01) |
| *G06Q 10/10* | (2012.01) |
| *G08B 21/00* | (2006.01) |
| *H04M 1/725* | (2006.01) |
| *H04W 68/00* | (2009.01) |
| *G06F 3/00* | (2006.01) |

(58) Field of Classification Search
USPC ..................................................... 340/407.1
See application file for complete search history.

(56) References Cited

OTHER PUBLICATIONS

List of IBM Patents or Patent Applictions Treated As Related; (Appendix P), Filed Jan. 10, 2017, 2 pages.
Eli M. Dow, et al., Pending U.S. Appl. No. 14/939,353 entitled "Wearable Computing System With Temporal Feedback," filed Nov. 12, 2015.
List of IBM Patents or Patent Applictions Treated As Related; (Appendix P), Filed May 25, 2016, 2 pages.

\* cited by examiner

WEARABLE COMPUTING SYSTEM WITH TEMPORAL FEEDBACK

DOMESTIC PRIORITY

This application is a continuation of U.S. patent application Ser. No. 14/939,353, filed Nov. 12, 2015, the content of which is incorporated by reference herein in its entirety.

BACKGROUND

The present invention relates generally to a wearable computing system and, more specifically, to a wearable computing system that provides temporal feedback to the wearer.

Wearable computing systems, such as wrist watches, bands, jewelry and the like, provide the wearer with access to information and the ability to communicate with other computing devices such as mobile devices, laptop computers and computer networks. Some devices, such as cell phones for example, provide notifications to the user to indicate when new information, such as an incoming phone call or new e-mail message, has been received. These indications may be in the form of a discrete alarm, such as a vibration for example, that allows the device to notify the user without alerting nearby persons.

SUMMARY

Embodiments include a system, method, and computer program product for providing feedback to a user with a wearable device. A method includes providing a wearable device having a controller and a feedback mechanism, the feedback mechanism being configured to vibrate the wearable device in response to a signal from the controller. At least one prompt point is defined that is associated with a first time parameter. It is determined when the current time is equal to the first time parameter. The feedback mechanism is actuated in response to the current time being equal to the first time period.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments and aspects of the subject invention are directed to a system and method for notifying a wearer of a wearable computing device when a predetermined point in time has occurred. In one embodiment, the wearable computing device includes a feedback mechanism that vibrates the wearable device. In an embodiment, the wearable device cooperates with a presentation system to actuate feedback mechanism at predetermined points within the presentation. In an embodiment, the wearable device actuates the feedback mechanism occurs at least once every sixty minutes, such as at the beginning of an hour, to notify the wearer of the time. In an embodiment, the actuation of the feedback device may be varied based on duration, intensity and direction to notify the wearer of events or times.

Figure 1:
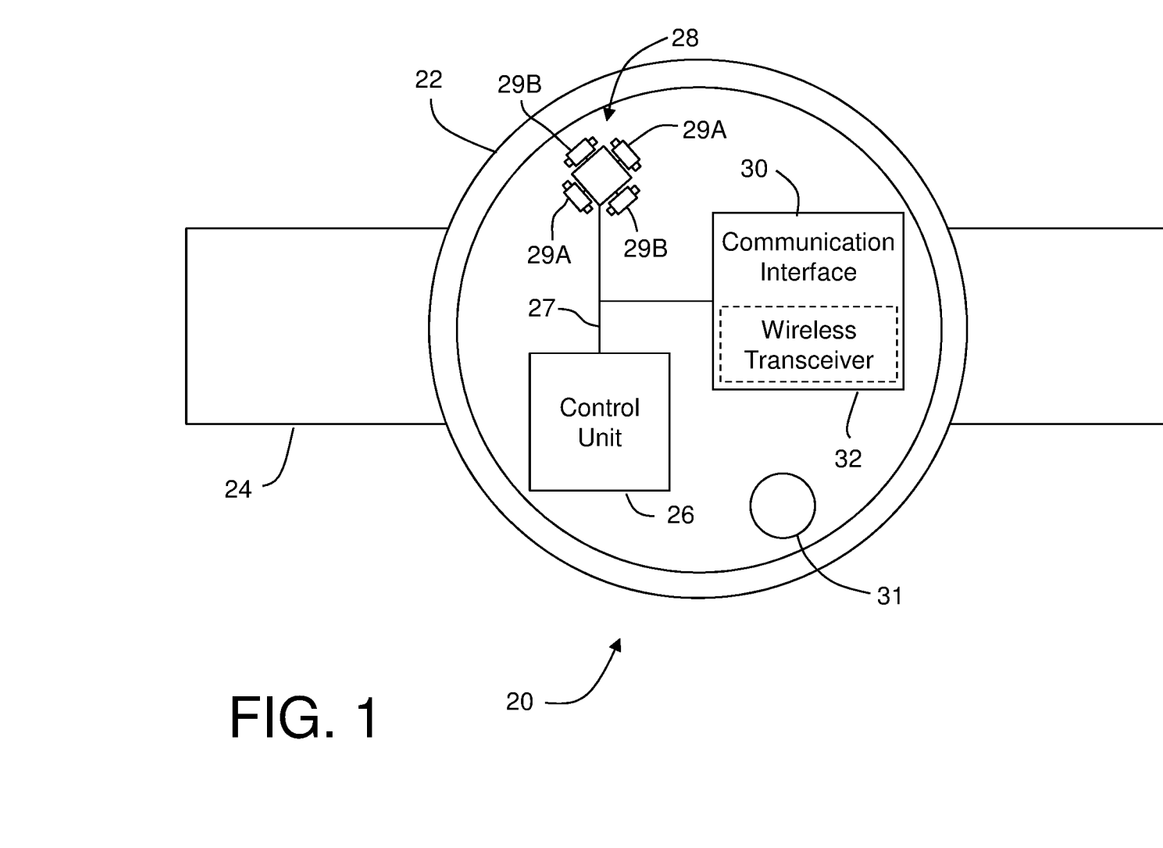
FIG. 1 depicts a diagram of a wearable computing device in accordance with an embodiment.

Turning now to FIG. 1, a wearable computing device 20 is shown. In an embodiment, the wearable computing device 20 includes a housing 22 and an attachment member 24. The attachment member 24 may be configured to removably attach or couple the wearable computing device 20 to the user or the user's clothing for example. In the illustrated embodiment and the description herein, the wearable computing device 20 may be shown or described as a wrist watch having a band. It should be appreciated that these embodiments are for example purposes and the claims should not be so limited. In other embodiments, the wearable computing device 20 may be another article, such as but not limited to: clothing, eye glasses, bands, jewelry, rings, smart rings, electronic rings, pendants, necklaces and pins for example.

The wearable computing device 20 includes a control unit 26 that is configured execute methods disclosed herein and provide haptic feedback to the user in response to predetermined conditions. The control unit 26 is a suitable electronic device capable of accepting data and instructions, executing the instructions to process the data, and presenting the results.

In an embodiment, the control unit 26 may accept instructions through a user interface, such as a touch screen display, capacitive switches or physical buttons for example. The control unit 26 may also accept instructions through other means such as but not limited to electronic data card, voice activation means, manually-operable selection and control means, radiated wavelength and electronic or electrical transfer. In one embodiment, the control unit 26 may be further coupled to communicate with an audio input device, such as a microphone 31. The microphone 31 may be connected to the control unit 26 through data transmission media 27 for example. Microphone 31 may also be disposed in an external device (e.g. a headset) that connects to the control unit 26 through a wireless connection, such as Bluetooth for example.

In an embodiment, control unit 26 is operably coupled with one or more components of wearable computing device 20 by data transmission media 27. Data transmission media 27 includes, but is not limited to, twisted pair wiring, coaxial cable, fiber optic cable, and an integrated circuit. Data transmission media 27 also includes, but is not limited to, wireless, radio and infrared signal transmission systems. In the embodiment shown in FIG. 1, the transmission media 27 couples control unit 26 to a feedback mechanism 28 and a communication interface 30. It should be appreciated that while embodiments herein describe the control unit 26, feedback mechanism 28 and communications interface 30 as being discrete and separate components, this is for example purposes and the claims should not be so limited. In other embodiments, the control unit 26, feedback mechanism 28 and communications interface 30 may be integrated into a single circuit or other suitable electronic packaging arrangement.

In one embodiment, the feedback mechanism 28 is a vibrational motor or a linear motor for example. As used herein, a vibrational motor is a motor having a shaft with an eccentric mass such that upon actuation, the motor produces a vibration. In an embodiment, the feedback mechanism 28 is an orthogonal linear actuator motor. In an embodiment, the feedback mechanism 28 includes two linear actuators arranged perpendicular to each other. In one embodiment, the orthogonal linear actuator motor may include two pairs of linear actuators 29A, 29B arranged on opposing edges of a square. This arrangement allows for the generator of perpendicular haptic sensation or a clockwise/counter-clockwise haptic sensation. In still another embodiment, the feedback mechanism includes a plurality of linear actuators arranged about the periphery of an octagonal shape. The octagonal shape may be sized such that the plurality of linear actuators is disposed adjacent to the perimeter of the wearable computing device (e.g. the perimeter of the watch face). In still a further embodiment, the feedback mechanism 28 includes three linear actuators. Two of the three linear actuators are arranged orthogonally to each other and operate in the same plane (e.g. parallel to the front or rear face of the wearable computing device). The third actuator is arranged orthogonal to the plane of the first two linear actuators. In other words, the linear actuators are arranged to provide an X, Y, Z Cartesian coordinate feedback to the user.

It should be appreciated that other haptic communication mechanisms may also be used to produce a mechanical or electrical stimulation or sensation that provides tactual notification to the user.

The communications circuit 30 facilitates communication between the control unit 26 with external devices using computer communications protocols, such as TCP/IP (transmission control protocol/internet protocol) and the like for example. The communication unit 26 may be adapted to receive wired or wireless signals. In an embodiment, through communications with external devices, the wearable computing device 20 may cooperate with the external devices to provide a haptic notification to the user. In one embodiment, the communication circuit 30 includes a short range wireless transceiver, such a Bluetooth transceiver 32 (e.g. IEEE 802.15.1), Zigbee (e.g. IEEE 802.15.4), WiFi (e.g. IEEE 802.11) or other wireless transmission medium protocol/standard. This enables communication with nearby external devices, such as but not limited to a cellular phone, a laptop, other wearable computing devices or an image projector for example. The communications unit 28 may also be configured to communicate using other wireless protocols, such as but not limited to WiFi standards (e.g. IEEE 802.11) for example.

Figure 2:
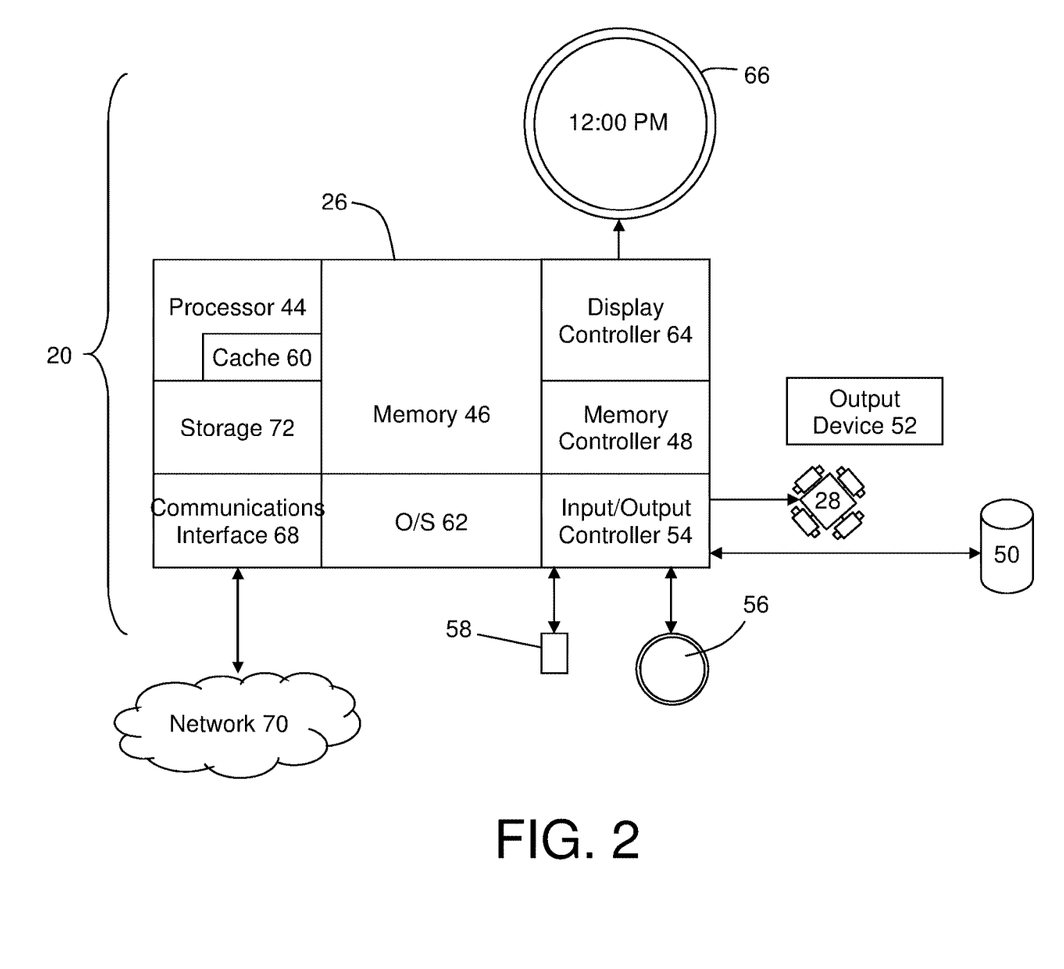
FIG. 2 depicts a block diagram of a wearable computing device for implementing some or all aspects of the device of FIG. 1, according to some embodiments of this disclosure.

One embodiment of the wearable computing device 20 is shown in FIG. 2. In this embodiment, the wearable computing system 20 includes a processor 44, memory 46 coupled to a memory controller 48, and one or more input devices 50 and/or output devices 52, such as peripherals, that are communicatively coupled via a local I/O controller 54. These devices 50 and 52 may include, for example, feedback mechanism 28, an audio speaker, a microphone, and the like. Input devices such as a touchscreen device 56 and physical buttons 58 may be coupled to the I/O controller 54. The I/O controller 54 may be, for example, one or more buses or other wired or wireless connections, as are known in the art. The I/O controller 54 may have additional elements, which are omitted for simplicity, such as controllers, buffers (caches), drivers, repeaters, and receivers, to enable communications.

The I/O devices 56, 58 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 44 is a hardware device for executing hardware instructions or software, particularly those stored in memory 46. The processor 44 may be a custom made or commercially available processor, a central processing unit (CPU), an auxiliary processor among several processors associated with the wearable computing device 20, a semiconductor based microprocessor (in the form of a microchip or chip set), a macroprocessor, or other device for executing instructions. The processor 44 includes a cache 60, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 60 may be organized as a hierarchy of more cache levels (L1, L2, etc.).

The memory 46 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 46 may incorporate electronic, magnetic, optical, or other types of storage media. Note that the memory 46 may have a distributed architecture, where various components are situated remote from one another but may be accessed by the processor 44.

The instructions in memory 46 may include one or more separate programs, each of which comprises an ordered listing of executable instructions for implementing logical functions. In the example of FIG. 2, the instructions in the memory 46 include a suitable operating system (OS). The operating system essentially may control the execution of other computer programs and provides scheduling, input-output control, file and data management, memory management, and communication control and related services.

Additional data, including, for example, instructions for the processor 44 or other retrievable information, may be stored in storage 72, which may be a storage device such as a hard disk drive or solid state drive. The stored instructions in memory 46 or in storage 72 may include those enabling the processor to execute one or more aspects of the systems and methods of this disclosure.

The computer system 42 may further include a display controller 64 coupled to a display 66. As discussed above, in some embodiments the wearable computing system 20 may further include communications interface 30 for coupling to a network 70. The network 70 may be an IP-based network for communication between the computer system 42 and an external server, client and the like via a broadband connection. The network 70 transmits and receives data between the wearable computing system 20 and external systems. For example, the network 70 may connect the presentation system 34 (FIG. 3) for example. In some embodiments, the network 70 may be a managed IP network administered by a service provider. The network 70 may be implemented in a wireless fashion, e.g., using wireless protocols and technologies, such as WiFi, WiMax, etc. The network 70 may also be a packet-switched network such as a local area network, wide area network, metropolitan area network, the Internet, or other similar type of network environment. The network 70 may be a fixed wireless network, a wireless local area network (LAN), a wireless wide area network (WAN) a personal area network (PAN), a virtual private network (VPN), intranet or other suitable network system and may include device for receiving and transmitting signals.

Systems and methods according to this disclosure may be embodied, in whole or in part, in computer program products or in wearable computing device 20, such as that illustrated in FIG. 2.

Figure 3:
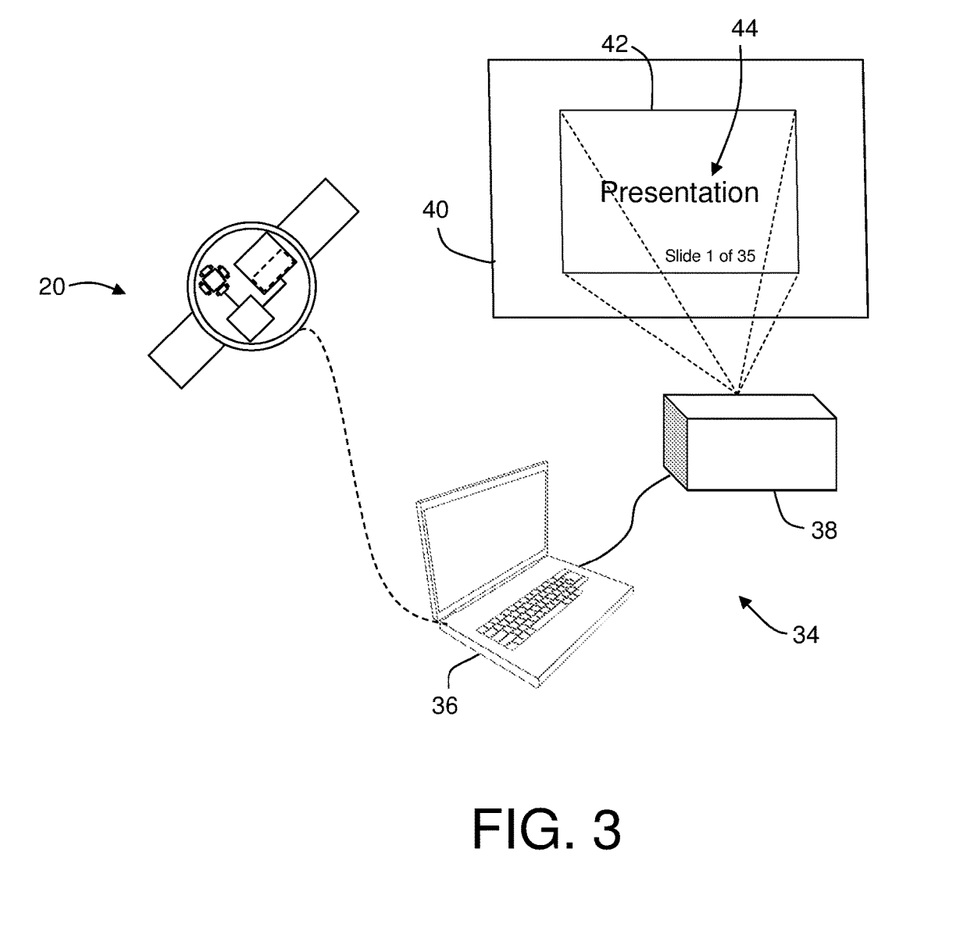
FIG. 3 is a schematic illustration of the wearable device of FIG. 1 used with a presentation system in accordance with some embodiments of this disclosure.
Figure 4:
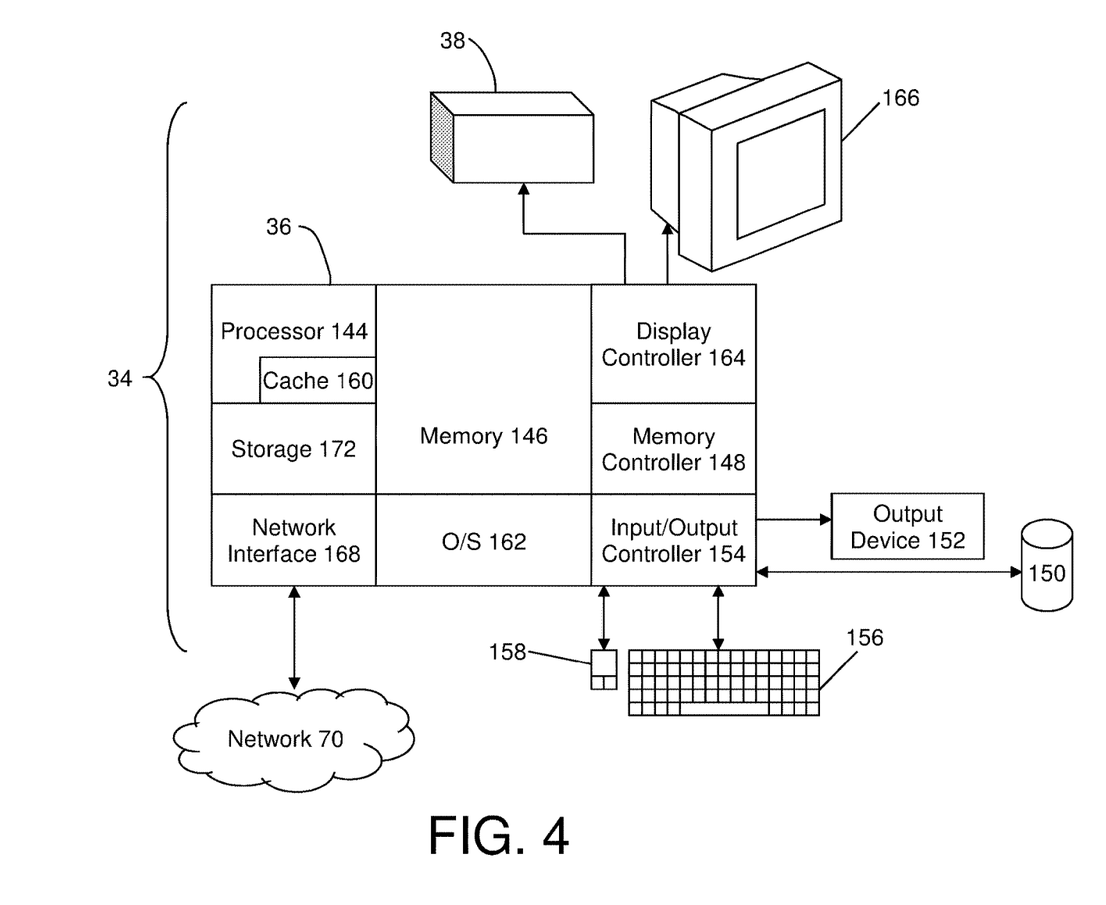
FIG. 4 is a block diagram of a computing device for implementing some or all aspects of the presentation system of FIG. 3 in accordance with some embodiments of this disclosure.

Referring now to FIG. 3, with continuing reference to FIG. 1 and FIG. 2, a presentation system 34 is shown that cooperates with the wearable device 20. In an embodiment, the presentation system 34 includes a computing device 36, such as a laptop for example, and a projecting device 38. One embodiment of the presentation system 34 is shown in FIG. 4. In this embodiment, the presentation system 34 includes a processor 144, memory 146 coupled to a memory controller 148, and one or more input devices 150 and/or output devices 152, such as peripherals that are communicatively coupled via a local I/O controller 54. These devices 150 and 152 may include, for example, scanners, printers, speakers, microphones and the like. Input devices such as a keyboard 156 and mouse 158 may be coupled to the I/O controller 154. The I/O controller 154 may be, for example, one or more buses or other wired or wireless connections, as are known in the art. The I/O controller 154 may have additional elements, which are omitted for simplicity, such as controllers, buffers (caches), drivers, repeaters, and receivers, to enable communications.

The I/O devices 156, 158 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 144 is a hardware device for executing hardware instructions or software, particularly those stored in memory 146. The processor 144 may be a custom made or commercially available processor, a central processing unit (CPU), an auxiliary processor among several processors associated with the computing device 34, a semiconductor based microprocessor (in the form of a microchip or chip set), a macroprocessor, or other device for executing instructions. The processor 144 includes a cache 160, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 160 may be organized as a hierarchy of more cache levels (L1, L2, etc.).

The memory 146 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 146 may incorporate electronic, magnetic, optical, or other types of storage media. Note that the memory 146 may have a distributed architecture, where various components are situated remote from one another but may be accessed by the processor 144.

The instructions in memory 146 may include one or more separate programs, each of which comprises an ordered listing of executable instructions for implementing logical functions. In the example of FIG. 3, the instructions in the memory 46 include a suitable operating system (OS) and a presentation computer program. The operating system essentially may control the execution of other computer programs and provides scheduling, input-output control, file and data management, memory management, and communication control and related services. The presentation computer program is configured to display predetermined images 42 on the display 166 or through the projector 38. In an embodiment, the images 42 may be composed of a plurality of individual slides that are arranged for sequential displaying. Each slide may include graphical or textual information or data 44

Additional data, including, for example, instructions for the processor 144 or other retrievable information, may be stored in storage 172, which may be a storage device such as a hard disk drive or solid state drive. The stored instructions in memory 146 or in storage 172 may include those enabling the processor to execute one or more aspects of the systems and methods of this disclosure.

The computing device 36 may further include a display controller 164 coupled to a display 166 and projector 38. The computing device 36 may further include network interface 168 for coupling to the network 70. The network 70 may be an IP-based network for communication between the computing device 34 and an external server, client and the like via a broadband connection. The network 70 transmits and receives data between the computing device 36 and external systems. In some embodiments, the network 70 may be a managed IP network administered by a service provider. The network 70 may be implemented in a wireless fashion, e.g., using wireless protocols and technologies, such as WiFi, WiMax, etc. The network 70 may also be a packet-switched network such as a local area network, wide area network, metropolitan area network, the Internet, or other similar type of network environment. The network 70 may be a fixed wireless network, a wireless local area network (LAN), a wireless wide area network (WAN) a personal area network (PAN), a virtual private network (VPN), intranet or other suitable network system and may include device for receiving and transmitting signals.

The projector 38 is a device that is suitable for emitting light and projecting an image, such as an image from the presentation computer program for example, onto an external screen 40. It should be appreciated that presentation system 34 may be configured in other suitable means other than a projector 38 and a screen 40 and the claims should not be so limited. In other embodiments, the presentation system 34 may include the computing device 36 connected to one or more displays, such as LCD monitors for example. In still other embodiments, the presentation system 34 uses the display 166 that is directly coupled to the computing device 36.

Figure 5:
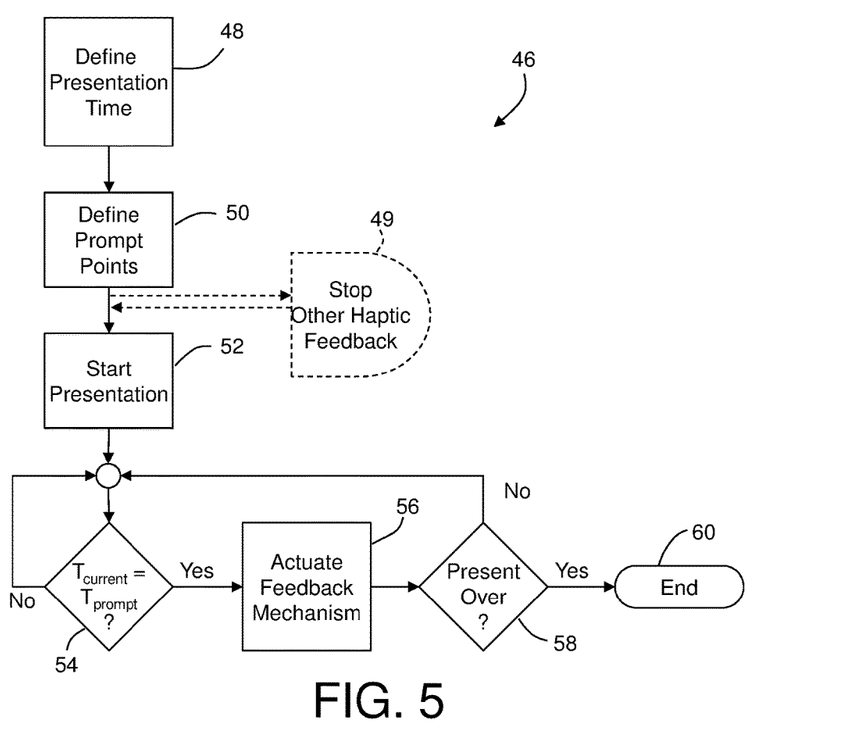
FIG. 5 is a flow diagram of a method of notifying a wearer of the wearable device of FIG. 1 of the status of a presentation in accordance with some embodiments of this disclosure.
Figure 6:
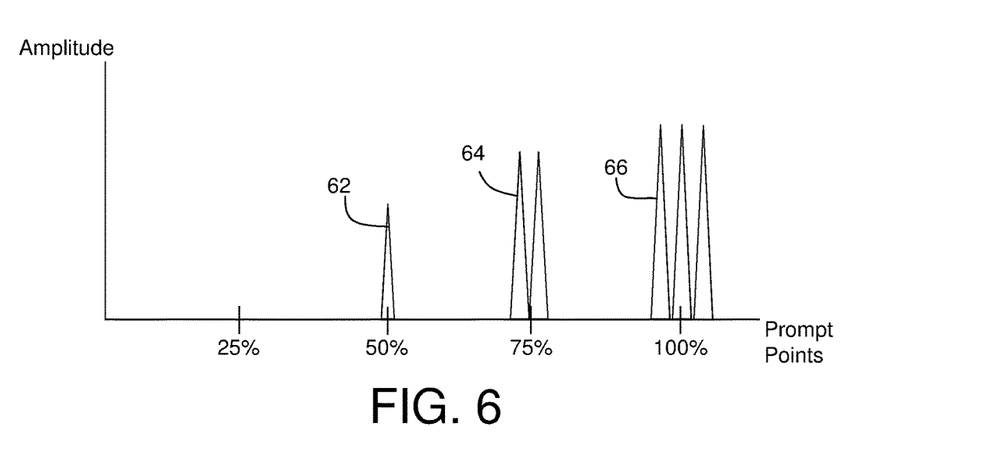
FIG. 6 is a graphical plot of the amplitude of a feedback mechanism as a function of presentation prompt points in accordance with some embodiments of this disclosure.

Referring now to FIG. 5 and FIG. 6, an exemplary process 46 is shown for using the wearable computing device 20 with the presentation system 34 for providing haptic feedback to the user. In some instances, the user of the presentation system 34 may have limits on the presentation, such as time limits for example. In other instances, the user may desired to know when they have reached a certain point, such as 50% completed, slide 20 of 40, or two slides before the end for example. Some embodiments provide advantages in providing feedback to the user at predetermined points in time using the wearable computing device 20. The process 46 illustrates a situation where the user has a limited amount of time before the audience to convey the presentation. The process 46 starts in block 48 where the presentation time (e.g. 30 minutes) is defined. The process 46 then proceeds to block 50 where the prompt points are defined. As used herein, the phrase "prompt point" is a temporal parameter indicating when the user will receive haptic feedback. A prompt point may be based on the length of the presentation, such as 50% completed, 75% completed and 100% completed for example. The prompt point may also be based on a fixed time parameter, such as 30 minutes or 45 minutes for example. It should be appreciated that the presentation time and prompt points may be defined in the wearable computing device 20, the computing device 36 or a combination of the foregoing.

It should be appreciated that the wearable computing device 20 may provide haptic feedback to the user with a variety of computer program applications. These may include a current time process discussed herein, or other processes such as indicating new email, voicemail or text messages for example. In an embodiment, the process 46 may include an optional step of inhibiting, suppressing or stopping other haptic feedback to the user in block 49 while the process 46 is active. This may assist in avoiding confusion with the user between the haptic feedback from process 46 and those from another process. In an embodiment, the inhibiting, suppressing or stopping of other haptic feedback for a predetermined amount of time, such as the defined presentation time for example.

The process 46 then proceeds to block 52 where the presentation is initiated. In block 54 it is determined if the current time, $T_{current}$, is equal to the time of a prompt point, $T_{prompt}$. When the query block 54 returns a negative, the process 46 loops back and continues to compare the current time with the prompt time. When the query block 54 returns a positive, the process 46 proceeds to block 56 where the feedback mechanism 28 is actuated to provide haptic feedback to the user. In one embodiment, the actuation of the feedback mechanism 28 may be in the form of a pulse actuation or short duration vibration. The user may define different numbers of pulse actuations for different prompt points. In the example illustrated in FIG. 6, a single pulse 62 is actuated 50% through the presentation, two pulses 64 at 75% and three pulses 66 at 100%. In an embodiment, the user may also be able to define the amplitude, intensity or strength of the pulse for each prompt point. In some embodiments, the pulse actuation may occur on a periodic basis, such as once every sixty minutes where the number of pulse actuations is based on the time of day. In the example illustrated in FIG. 6, the amplitude of the pulse increases as the amount of time spent conveying the presentation approaches the time limit.

In one embodiment, the wearable computing device 20 monitors the time and actuates the feedback mechanism 28. In another embodiment, the computing device 36 (such as through the presentation computer program) compares the current time $T_{current}$ to the prompt time $T_{prompt}$. In this embodiment, the computing device 36 transmits a signal to the wearable computing device 20. The wearable computing device 20 in response to the receiving the signal actuates the feedback mechanism 28.

After actuating the feedback mechanism 28, the process 46 proceeds to query block 58 where it is determined whether the presentation is over ($T_{current}$ equals the presentation length). When query block 58 returns a negative, meaning the current time is prior to the defined presentation end time. When query block 58 returns a positive, meaning the allotted time for the presentation has been used or the ending time reached, the process 46 proceeds to block 60 and ends.

It should be appreciated that in some instances, the user may not have a time limit but rather desires to have feedback when they have achieved certain portions of the presentation. In this embodiment, the number of slides may be defined rather than the length of time for the presentation in block 48. The prompt points may then be defined either in terms of a percent completion or a slide value. For example, for a presentation having 40 slides, a prompt point for half way through the presentation may be defined as slide 20 or 50%. In this embodiment, the computing device 36 transmits a signal to the wearable computing device 20 when the prompt point is reached.

In one embodiment, the actuation of the feedback mechanism 28 may be defined in terms of the amplitude and duration. In this embodiment, rather than several discrete pulses, the actuation of the feedback mechanism 28 may be for a period of time. It should be appreciated that the user may use a combination of the number pulses and duration of the pulses for the haptic feedback generated at the prompt points.

In still other embodiments, the wearable computing device 20 may be used with other computer software programs executing on the wearable computing device 20 alone or in cooperation with external computing devices. For example, if the user is executing an evaluation or analytics software, the external computing device may transmit a signal when a predetermined condition is satisfied and haptic feedback provided. For example, if the computing device is executing a behavior modification computer software program and the user's behavior is outside of the desired behavior, the wearable device 20 may use haptic feedback by actuating the feedback mechanism. This alerts the user that they may need to change their current behavior. In some embodiments, the evaluation and analytics software is executed at least partially on the control unit 26.

In still other embodiments, the wearable computing device 20 may cooperate with computer software programs to provide haptic feedback at predetermined prompt points. For example, a user may desire to know when media, such as a song, movie or video for example, is at a certain level of completion (e.g. 50%) or at a set time prior to the end (e.g. 5 minutes before the end). Some of these embodiments may provide advantages for instructors in determining whether to interrupt the media. In a classroom environment the haptic feedback may be used to remind the instructor to stop and elaborate on a particular point for example. In other embodiments, the wearable computing device may be used by a trainer or exercise instructor as feedback on how much time remains in a session or a portion of a session without disturbing the participants. In embodiments where the exercise session is following a preset routine (e.g. a commercialized exercise program), the media for the preset routine may be played on a computing device (e.g. computing device 36) using an exercise computer software that transmits a signal to the wearable computing device 20. The wearable computing device 20 then may provide haptic feedback to the instructor at the prompt points, such as one-minute until the next exercise or five-minutes until the end of the session.

Figure 7:
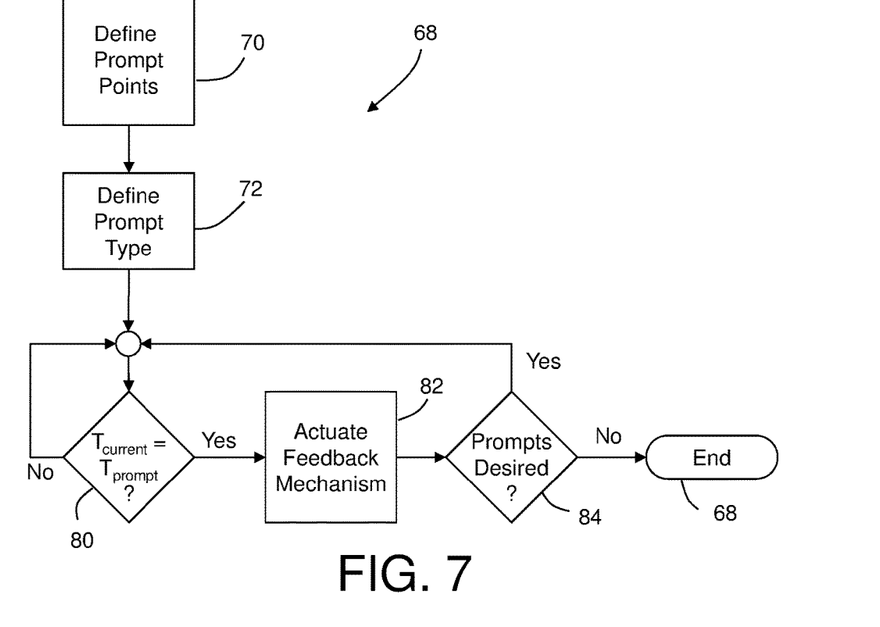
FIG. 7 is a flow diagram of a method of notifying a wearer of the wearable device of FIG. 1 of the time in accordance with some embodiments of this disclosure.
Figure 8:
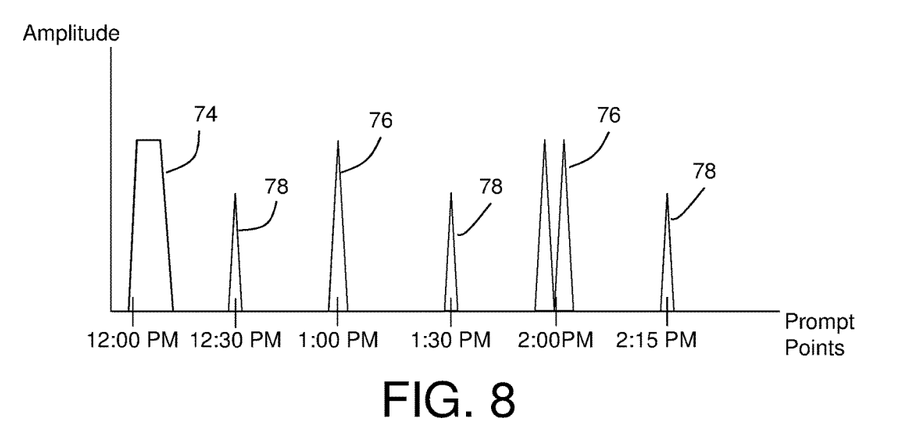
FIG. 8 is a graphical plot of the amplitude of a feedback mechanism as a function of time in accordance with some embodiments of this disclosure.

Referring now to FIG. 7 and FIG. 8, a process 68 is illustrated for using haptic feedback with the wearable device 20 to alert the user to the current time. A category of wrist watches and pocket watches have been created known as a "striking clock" and "repeaters" that would chime to provide the user with an indication of the time. In the case of a striking clock, the watch would chime on a periodic basis, such as at the beginning of each hour (e.g. 12 PM, 1 PM, 2 PM, etc.). In the case of a repeater watch, the watch would chime the time in response to activation by the user.

The process 68 starts in block 70 where the user defines prompt points. For example, the user may want to be notified at the beginning of each the hour, at each half-hour point (e.g. 12:00 PM, 12:30 PM, 1:00 PM, 1:30 PM, etc.) or at any user defined period that is desired. The process then proceeds to block 72 where the user defines the type of haptic feedback that will be used. As illustrated in FIG. 8, the feedback that is generated by the wearable computing device 20 may be defined by the user to identify the prompt point. For example, at 12:00 AM and 12:00 PM, the actuation of the feedback mechanism 28 may be a vibration 74 for a period of time. The feedback provided at the beginning of each hour (other than 12:00 AM and 12:00 PM) may be a short pulse 76 with the number of pulses being determined by the time with one pulse for 1 AM/PM, two pulses for 2 AM/PM and 3 pulses for 3 AM/PM for example. The feedback for intermediary periods (e.g. 12:30 or 2:15 PM) may be a short pulse 78 having smaller amplitudes than the pulses at the beginning of the hour for example. In some embodiments, the prompt types may be predefined and not selectable by the user.

The process 68 then proceeds to query block 80 where it is determined whether the current time, $T_{current}$, is equal to the prompt time, $T_{prompt}$. When the query block 80 returns a negative, the process 68 loops back and continues to monitor the time. When the query block 80 returns a positive, the process 68 proceeds to block 82 where the feedback mechanism 28 is actuated. As discussed above, the actuation of the feedback mechanism 28 may change based on the prompt point that has been reached. After actuating the feedback mechanism 28, the process 68 proceeds to query block 84 where it is determined if the user still desires for feedback based on the current time. For example, the wearable computing device 20 may allow the user to enable or disable the haptic feedback feature. If the query block 84 returns a positive, the process 68 loops back to monitor the current time. If query block 84 returns a negative, the process 68 proceeds to block 86 and ends.

In an embodiment, if the process 68 is active and the user initiates another process that uses haptic feedback, such as presentation process 46 for example, the process 68 may be suspended to avoid providing misleading feedback to the user. In another embodiment, two feedback processes may execute simultaneously on the wearable device with the feedback mechanism 28 being actuated differently for each process to allow the user to distinguish between the prompt points for the different processes.

In one embodiment, the haptic feedback to indicate the time may be user initiated. The user may use a user-interface, such as touch screen 56 or button 58 for example, to manually activate the haptic feedback to indicate the current time. In this embodiment, the control unit 26 may pulse or use a combination of pulse durations with the feedback mechanism 28 to indicate the time in response to the activation of the user-interface. For example, the hour may be indicated using a long pulse (e.g. 2 seconds) and the minutes using short pulses (e.g. 0.5 seconds). In some embodiments, the time may be indicated using a first pulse type (e.g. long pulse) to indicate hours, a second pulse type (e.g. short pulse of a first amplitude) to indicate the last quarter hour and a third pulse type (e.g. short pulse of a second amplitude). It should be appreciated that other sequences may also be used. In some embodiments, this may provide advantages in allowing the user to discretely check the time without nearby persons knowing. In still other embodiments this may provide advantages in allowing persons who are visually impaired to check the time.

It should be appreciated that while embodiments herein illustrated time is divided into two twelve-hour periods is for example purposes and the claims should not be so limited. In other embodiments, the time is based on a 24 hour clock.

Technical effects and benefits of some embodiments include providing haptic feedback to a user with a wearable computing device at points in time where the user desires to be reminded.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for providing feedback to a user with a wearable device, the method comprising:

providing a wearable device having a controller and a feedback mechanism, the feedback mechanism being configured to vibrate the wearable device in response to a signal from the controller;

defining at least one prompt point associated with a first time parameter;

determining when a current time is equal to the first time parameter; and actuating the feedback mechanism in response to the current time being equal to the first time parameter; and executing a computer application that displays a video, wherein the first time parameter is defined based at least in part on a length of the video.

2. The method of claim 1 wherein the defining at least one prompt point further includes:

defining a number of slides in a presentation; and defining at least one slide number when feedback will be provided.

3. The method of claim 2 wherein the first time parameter is a time when the at least one slide number is displayed.

4. The method of claim 3 further comprising receiving a second signal at the wearable device when the at least one slide number is displayed.

5. The method of claim 1 wherein the first time parameter is a length of time allotted for a presentation and the at least one prompt point includes a second time parameter, the second time parameter occurring during the first time parameter.

6. The method of claim 1 wherein the first time parameter is a point in time that occurs at least once every sixty minutes.

7. The method of claim 6 further comprising periodically pulse actuating the feedback mechanism, wherein the number of pulse actuations is based at least in part on a time of day.

8. The method of claim 6 wherein the feedback mechanism is actuated for a time period, the time period having a length that is based at least in part on a time of day.

9. A computer implemented method for providing feedback to a user with a wearable device, the method comprising:

providing a wearable device having a controller and a feedback mechanism, the feedback mechanism being configured to vibrate the wearable device in response to a signal from the controller;

defining at least one prompt point associated with a first time parameter, wherein the first time parameter is a point in time that occurs at least once every sixty minutes;

determining when a current time is equal to the first time parameter; and actuating the feedback mechanism in response to the current time being equal to the first time parameter;

stopping the actuating of the feedback mechanism in response to the current time for a predetermined amount of time in response to the feedback mechanism being actuated a second prompt point not associated with the current time.

\* \* \* \* \*